April 10, 1956     S. G. BURGER     2,741,527
OVERLOAD RELAY CIRCUIT
Filed April 1, 1955
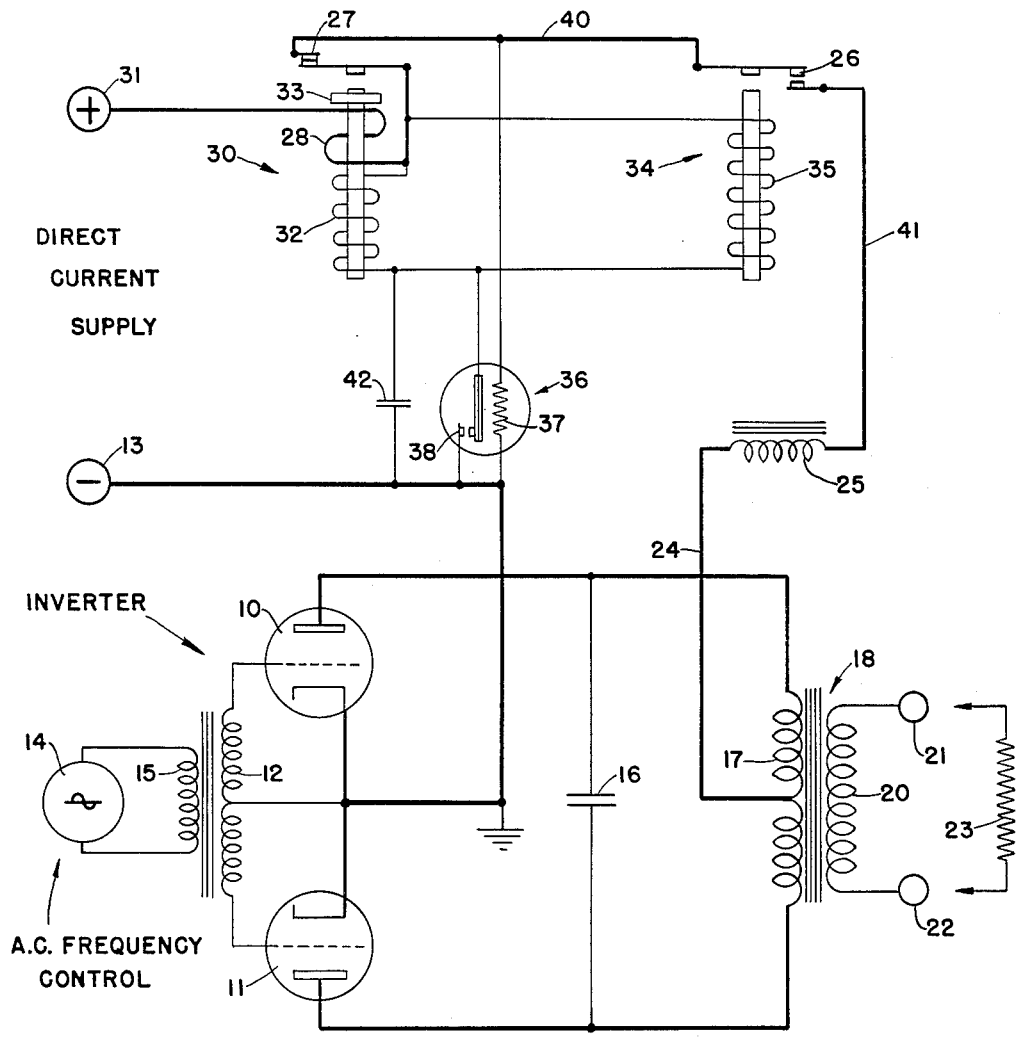
SEYMOUR G. BURGER
INVENTOR
BY Ralph E. Bitner
ATTORNEY United States Patent Office 2,741,527
Patented Apr. 10, 1956

2,741,527

OVERLOAD RELAY CIRCUIT

Seymour G. Burger, Bridgeport, Conn., assignor to Sorensen and Company, Inc., a corporation of Connecticut Application April 1, 1955, Serial No. 498,669

7 Claims. (Cl. 321—14)

This invention relates to an overload relay circuit which may be connected to the output of an electronic inverter circuit. It has particular reference to a relay circuit which is self-normalizing and includes certain characteristics which protect parts of the inverter circuit during a starting or warm-up period.

Modern inverters which change direct current into alternating current at a predetermined frequency generally employ gas-filled triodes because of the high current available and the characteristically low internal resistance of these devices. For these reasons most inverter circuits employ either the thyratron or the mercury arc type tube. It has been customary to insert an overload circuit breaker in the output of such inverter circuits to protect the load and also the electronic components of the inverter. Such an arrangement has the disadvantage of producing a complete disruption of the inverter operation until the relay or circuit breaker is manually reset. During the operation of an inverter circuit which includes two gaseous discharge devices, the failure of one discharge device to fire (start conducting) produces a large direct current in the other discharge device which may cause destruction of the device itself or may seriously injure circuit components in the inverter circuit. In such an event, overload protection is necessary but in many such instances the normal inverter operation may be resumed after a short time interval and therefore an automatic reset feature is important and a practical necessity.

One of the objects of this invention is to provide an overload relay for inverters which avoids one or more of the disadvantages and limitations of prior art arrangements.

Another object of the invention is to provide overload protection for inverter circuits which will absorb a minimum of power.

Another object of the invention is to provide an overload circuit for inverters which includes a time delay device resulting in a predetermined cyclic operation.

Another object of the invention is to provide protection for the inverter discharge devices during a starting period.

Another object of the invention is to provide undervoltage protection for inverters.

The invention comprises a relay circuit connected between the inverter and the supply of direct current power. Three relays are employed, one of which is temperature sensitive and is operated by a small heater element. A second relay includes a pair of normally closed contacts, a current winding connected in series with the power supply, and a voltage winding connected across the power supply in series with the contacts of the first relay. A third relay includes a pair of normally open contacts in series with the power supply and a voltage winding connected across the voltage winding of the second relay.

For a better understanding of the present invention, together with other and further objects thereof, reference is made to the following description taken in connection with the accompanying drawings.

The figure is a schematic diagram of connections showing an inverter circuit connected to the overload relay circuit.

Referring now to the drawing, the usual inverter circuit includes two gaseous discharge devices 10 and 11. Each of these devices contains an anode, a control electrode, and a cathode. The control electrodes are connected to opposite ends of a transformer secondary winding 12, the mid-point of which is connected to ground and the negative terminal 13 of a direct current power supply. A source of alternating current 14 is provided for controlling the output frequency and is connected to a primary winding 15 on the same core as secondary winding 12. The anodes of devices 10 and 11 are connected across the terminals of a capacitor 16 which is a necessary part of the inverter circuit. The anodes are also connected to the opposite ends of a primary winding 17 of an output transformer 18 having a secondary winding 20 connected to output terminals 21 and 22. The output terminals may be connected to a load circuit 23.

The mid-point of primary winding 17 is connected to a conductor 24 which provides the direct current power necessary for the inverter operation. In series with conductor 24 is a choke coil 25, contacts 26, contacts 27, a current coil 28 on a relay 30, and a terminal 31 which is connected to the direct current power source. Relay 30 includes the above mentioned current winding 28, a voltage winding 32, contacts 27 which are normally closed, and a heavy short-circuited turn 33 on one end of the relay core which slows up the operation of the relay armature. Contacts 26 are normally open when the direct current supply is not connected to terminals 31, 13. Contacts 26 are part of a relay 34 which contains a single voltage winding 35. In order to produce a delayed action which will be described later a temperature sensitive relay 36 is included in the overload circuit. This relay contains a heater element 37 and a pair of contacts 38 which are normally open when the direct current supply is not connected but which are closed during the operation of the inverter circuit. Contacts 38 may be operated by any of the usual temperature sensitive elements such as a bi-metallic strip.

The path of the direct current power may be traced from positive terminal 31, through the current coil 28 of relay 30, then through normally closed contacts 27, thence over conductor 40 to normally open contacts 26 which are closed during inverter operation, thence over conductor 41, choke 25, conductor 24, to the mid-point of winding 17, through windings 17 to the anodes of devices 10 and 11, through the discharge devices to their cathodes, to the ground and the negative terminal 13 of the direct current power supply. Voltage winding 32 of relay 30 is connected between contacts 33 and contacts 27. Voltage winding 35 of relay 34 is connected in parallel with winding 32. One of the contacts 38 is connected to ground and the heater 37 is connected between ground and conductor 40. A capacitor 42 is connected across contacts 37 in order to absorb the sparking at these contacts that would otherwise occur when they open.

The operation of this circuit is as follows: When the direct current supply is first connected to terminals 31—13, contacts 26 are open and the inverter does not operate but current is supplied to heater 37 in relay 36 by means of a circuit which may be traced through winding 28 and contacts 27. No other current flow is possible since at this time contacts 26 and 38 are open. After a starting time interval, which may be as long as one minute, the heat generated by heater element 37 closes contacts 38 and causes relay 34 to be actuated.

The circuit for winding 35 may be traced from the positive terminal 31, through winding 28, through winding 35, through contacts 38, to the negative terminal 13. The actuation of relay 34 closes contacts 26 thereby providing direct current power for the inverter circuit and sending an alternating current output to load circuit 23.

As long as the inverter continues its normal operation there will be no change in the relay circuit, the current through heater 37 causing contacts 38 to remain in their closed condition and the current through these contacts and winding 35 holding contacts 26 in their closed condition. It should be noted that a current also flows through voltage winding 32 through contacts 38 to ground but relay 30 is adjusted so that the normal current through windings 28 and 32 is not sufficient to open contacts 27.

Now let it be assumed that one of the discharge devices fails to fire or to initiate conduction when its control electrode is made positive. The result of this action is a large direct current through one-half of winding 17 and the other discharge device. The alternating current output is reduced to zero and normal inverter operation cannot be resumed because the application of alternating current voltage to the control electrode of the conducting tube has no influence on the current through it. Relay 30 is now actuated because of the excessive current through winding 28, opening contacts 27 and cutting off the current supply to winding 17 and the anodes of the discharge devices. This action also reduces the current in winding 28 but the relay armature remains in its actuated condition, holding contacts 27 open, because of the current in the voltage winding 32 which is strong enough to hold the armature after it has been moved to its actuated position. When contacts 27 are opened current through heater 37 is cut off and the bi-metallic strip starts to cool. When the strip temperature has been reduced sufficiently, contacts 38 open and current is cut off from windings 32 and 35 thereby closing contacts 27 and opening contacts 26.

In order to make sure that contacts 27 will not close before contacts 26 open a heavy turn 33 of conducting material is secured to the upper end of the core of relay 30. This turn delays the closing of contacts 27 and there is no possibility of a momentary application of the direct current supply to the discharge devices.

When contacts 27 are closed, current is again applied to heater 37 and the bi-metallic strip is slowly heated until contacts 38 are closed, current is sent through winding 35 and contacts 26 are thereby closed applying the direct current voltage again to the discharge devices 10 and 11. If the inverter resumes its normal operation the overload relay circuit will remain in this condition but if the inverter again refuses to furnish alternating power the same cycle of interruption and reconnection is put into operation.

Contacts 27 break the main supply current to the inverter and hence must be made of heavy material, designed to withstand considerable arcing. Contacts 26, on the other hand, are never opened when current is passing through them and for this reason may be made of much lighter material.

Relay 34 may be adjusted so that it will function as an under-voltage circuit breaker and if the voltage of the direct current supply falls below a predetermined value contacts 26 will open and the inverter will cease to operate.

While a specific inverter circuit has been described and illustrated it will be obvious that many changes and modifications may be made in the circuit characteristics and the relay settings without departing from the field of the invention which should be limited only by the scope of the appended claims.

I claim:

1. An overload relay circuit for inverters comprising, a current operated relay having a normally closed pair of contacts and a current winding connected in series with one conductor of a direct current supply, a voltage operated relay having a normally open pair of contacts in series with said direct current supply conductor, a thermal relay having a pair of normally open contacts connected in series with a voltage winding on the current relay and the other conductor of said supply, said thermal relay also including a heater connected between said other conductor and the stationary contact point on the current relay, a voltage winding on said voltage relay connected in parallel with the voltage winding on the current relay, and a connection between one side of said voltage windings and the movable contact of said pair on the current relay.

2. An overload relay circuit for inverters comprising, a current operated relay having a normally closed pair of contacts and a current winding connected in series with one conductor of a direct current supply, said current winding adapted to open the contacts when current above a predetermined value is flowing in the winding, a voltage operated relay having a normally open pair of contacts in series with said direct current supply conductor, a thermal relay having a pair of normally open contacts connected in series with a voltage winding on the current relay and the other conductor of said supply, said thermal relay also including a heater connected between said other conductor and the stationary contact point on the current relay, a voltage winding on said voltage relay connected in parallel with the voltage winding on the current relay, and a connection between one side of said voltage windings and the movable contact of said pair on the current relay.

3. An overload relay circuit for inverters in accordance with claim 2 wherein the voltage winding on said current relay is adapted to hold said movable contact in its operated open condition after the current winding has operated the current relay.

4. An overload relay circuit for inverters in accordance with claim 3 wherein the voltage operated relay receives operating current as soon as the contacts in the thermal relay are closed.

5. An overload relay circuit for inverters in accordance with claim 4 wherein said inverter includes a plurality of discharge devices which may fail to operate in a predetermined manner and pass excessive current.

6. An overload relay circuit for inverters in accordance with claim 4 wherein said voltage operated relay is adapted to be normalized and open its contacts whenever said supply voltage drops below a predetermined value.

7. An overload relay circuit for inverters in accordance with claim 4 wherein said current operated relay includes a short-circuited conductor on a relay core and is adapted to normalize its contacts after a time delay when the thermal relay contacts are open.

No references cited.